US006986435B2

(12) United States Patent
Sagal et al.

(10) Patent No.: US 6,986,435 B2
(45) Date of Patent: Jan. 17, 2006

(54) SELF-HEATING FOOD AND BEVERAGE CONTAINER MADE FROM A THERMALLY CONDUCTIVE POLYMER COMPOSITION

(75) Inventors: E. Mikhail Sagal, Wakefield, RI (US); James D. Miller, Marietta, GA (US)

(73) Assignee: Cool Options, Inc., Warwick, RI (US)

( * ) Notice: Subject to any disclaimer, the term of this patent is extended or adjusted under 35 U.S.C. 154(b) by 0 days.

(21) Appl. No.: 10/225,918

(22) Filed: Aug. 22, 2002

(65) Prior Publication Data

US 2003/0038140 A1 Feb. 27, 2003

Related U.S. Application Data

(60) Provisional application No. 60/314,370, filed on Aug. 23, 2001.

(51) Int. Cl.
*A47J 39/00* (2006.01)

(52) U.S. Cl. .................................................... 220/592.2

(58) Field of Classification Search ............. 220/592.2; 126/263.05

See application file for complete search history.

(56) References Cited

U.S. PATENT DOCUMENTS 3,101,707 A * 8/1963 Ryan et al. ............ 126/263.05
4,736,599 A * 4/1988 Siegel .......................... 62/294
4,771,761 A 9/1988 Doukhan et al. ........... 126/263
4,867,131 A 9/1989 van der Merwe et al. .. 126/263
5,153,553 A * 10/1992 Ruehl et al. ................ 337/273
5,483,949 A 1/1996 James ................... 126/263.05
5,628,304 A * 5/1997 Freiman ................ 126/263.09
6,048,919 A 4/2000 McCullough ............... 524/404
6,251,978 B1 6/2001 McCullough

FOREIGN PATENT DOCUMENTS

WO WO 99/26286 * 5/1999

* cited by examiner

*Primary Examiner*—Stephen Castellano
(74) *Attorney, Agent, or Firm*—Barlow, Josephs & Holmes, Ltd.

(57) ABSTRACT

The present invention relates to a self-heating container for heating consumable items such as food and beverages. The container assembly includes a star-shaped inner container for holding heating media that produces an exothermic reaction, and an outer container for holding a consumable item such as food and beverages. The inner container includes a thermally conductive polymer composition, and the outer container includes a heat-insulating material. The thermally conductive polymer composition includes a base polymer matrix and filler material.

12 Claims, 3 Drawing Sheets

SELF-HEATING FOOD AND BEVERAGE CONTAINER MADE FROM A THERMALLY CONDUCTIVE POLYMER COMPOSITION

CROSS-REFERENCE TO RELATED APPLICATIONS

This application claims the benefit of U.S. provisional application No. 60/314,370 having a filing date of Aug. 23, 2001.

BACKGROUND OF THE INVENTION

The present invention relates to a self-heating container for heating consumable items such as food and beverages. The container includes a heating medium that produces an exothermic reaction to warm the food and/or beverage. More particularly, the container is made from a thermally conductive polymer composition that can transfer heat effectively from the heating medium to the food/beverage.

Today, many people wish to pursue outdoor activities in environments where modern conveniences such as stoves and microwave ovens are not readily available. Activities such as mountain climbing, ice fishing, snowmobiling, and cross-country skiing are becoming more popular. These activities often take place in harsh climates where it is infeasible to prepare conventional hot meals. Still, many participants want to enjoy a hot meal or beverage while engaging in such pursuits. The food and beverage industry has developed self-heating food/beverage containers to meet this demand. Typically, these containers include two compartments. One compartment holds lime and the other compartment holds a sealed bag of water. A utensil can be used to pierce the bag and release the water. The layer of lime absorbs the flowing water and an exothermic reaction occurs. The reaction of the lime and water generates a sufficient amount of heat to warm the food/beverage.

Variations of self-heating cans are known in the prior art. These prior art systems have several drawbacks. First, the partition separating the fuel-containing chamber from the food/beverage chamber has a relatively small surface area for transferring heat. Second, this partition is made from plastic, such as polypropylene or polyethylene, which are heat-insulating materials. These non-conductive compositions limit the amount of heat that can be transferred across the partition. Third, the container has only a single outer wall, and heat can escape through this wall making the container hot-to-touch. Fourth, the poor heating mechanism of these devices means that the food/beverage must be heated for a longer period of time.

In view of the foregoing deficiencies among others, there is a need for an improved self-heating food/beverage container. The improved container should have a structure and design that allows for the effective transfer of heat from the heating medium to the chamber containing the food/beverage. The container should also have a structure and design that prevents heat from escaping through its outer walls. The present invention provides such containers.

SUMMARY OF THE INVENTION

The present invention relates to a self-heating container for heating consumable items such as food and beverages. The container assembly includes a combination of an inner and outer container. Particularly, the container assembly includes a star-shaped inner container for holding media, such as lime and water, that will produce an exothermic reaction. This inner container is made of a thermally conductive polymer composition. The composition includes a polymer matrix and thermally conductive filler material. Preferably, the inner container has a thermal conductivity of greater than 3 W/m°K and more preferably greater than 22 W/m°K. An outer container surrounds the inner container so that a chamber is formed between the two containers. The chamber between the inner container and outer container holds consumable items, such as food and beverages, that will be heated. The outer container is made of a heat-insulating material such as polystyrene.

The thermally conductive composition used to make the inner container can include a thermoplastic or thermosetting polymer matrix. For example, a thermoplastic polymer selected from the group consisting of polyethylene, acrylics, vinyls, and fluorocarbons can be used to form the matrix. Preferably, a liquid crystal polymer is used. Alternatively, a thermosetting polymer selected from the group consisting of elastomers, such as polysiloxanes and polyurethanes, epoxies, polyesters, polyimides, and acrylonitriles can be used.

Suitable thermally conductive filler materials include aluminum, alumina, copper, magnesium, brass, carbon, silicon nitride, aluminum nitride, boron nitride, and zinc oxide.

In a preferred embodiment, the outer container has a peripheral wall with a double-wall structure. Particularly, an outer wall segment completely surrounds an inner wall segment such that a gap exists between the two segments. The gap can be filled with air or other heat-insulating materials. The inner and outer wall segments are made of a heat-insulating material such as polystyrene.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

The present invention relates to a self-heating container assembly for heating consumable items such as food and beverages 19. The container assembly includes in combination a first (inner) 12 and second (outer) container 14.

Figure 1:
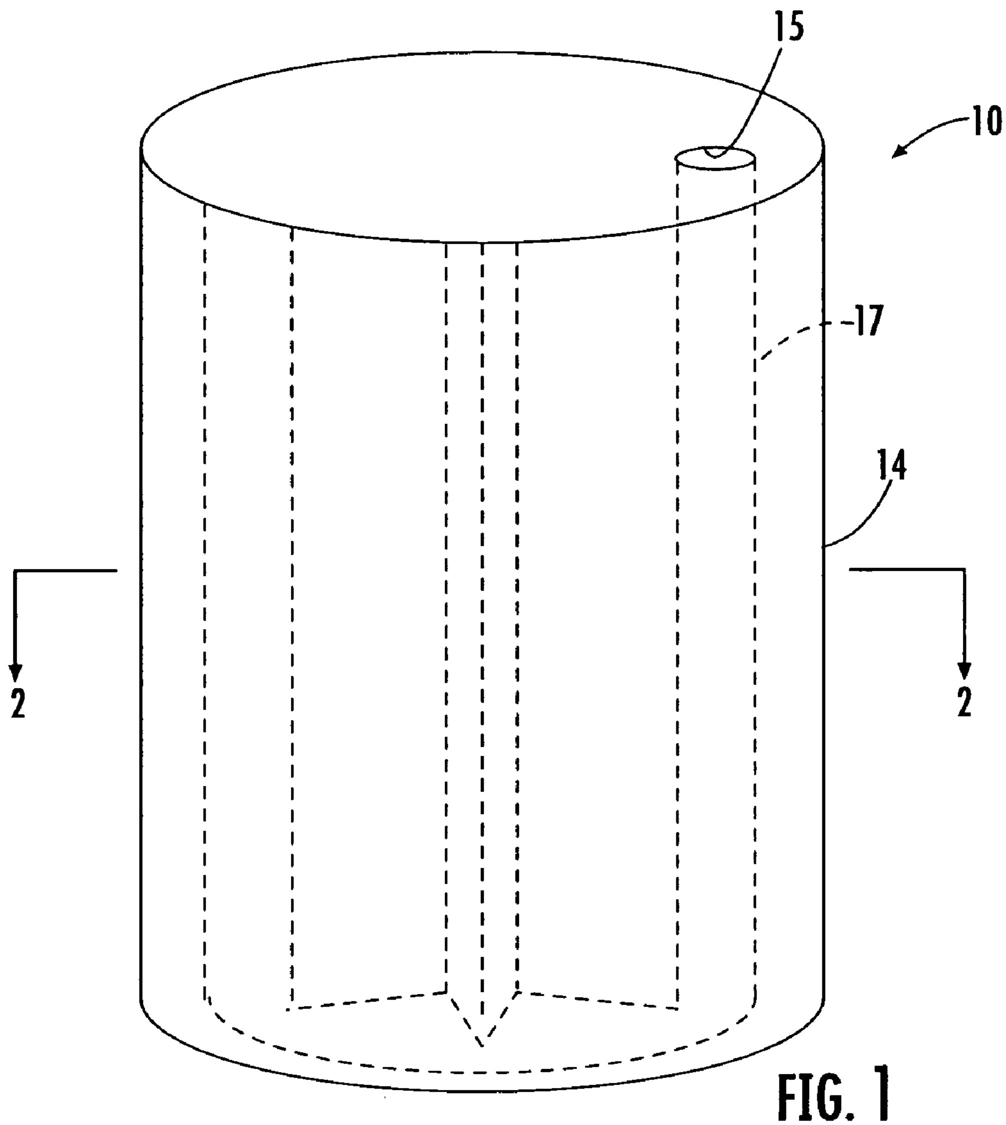
FIG. 1 is a front perspective view of a self-heating container assembly of the present invention.

FIG. 1 shows a front perspective view of the self-heating can 10 of the present invention having an outer container 14 with a spout 15 for access to the edible material within the can 10. A heating core, generally referred to as 17, resides within the outer container 14 to heat the edible material as described in detail below.

Figure 2:
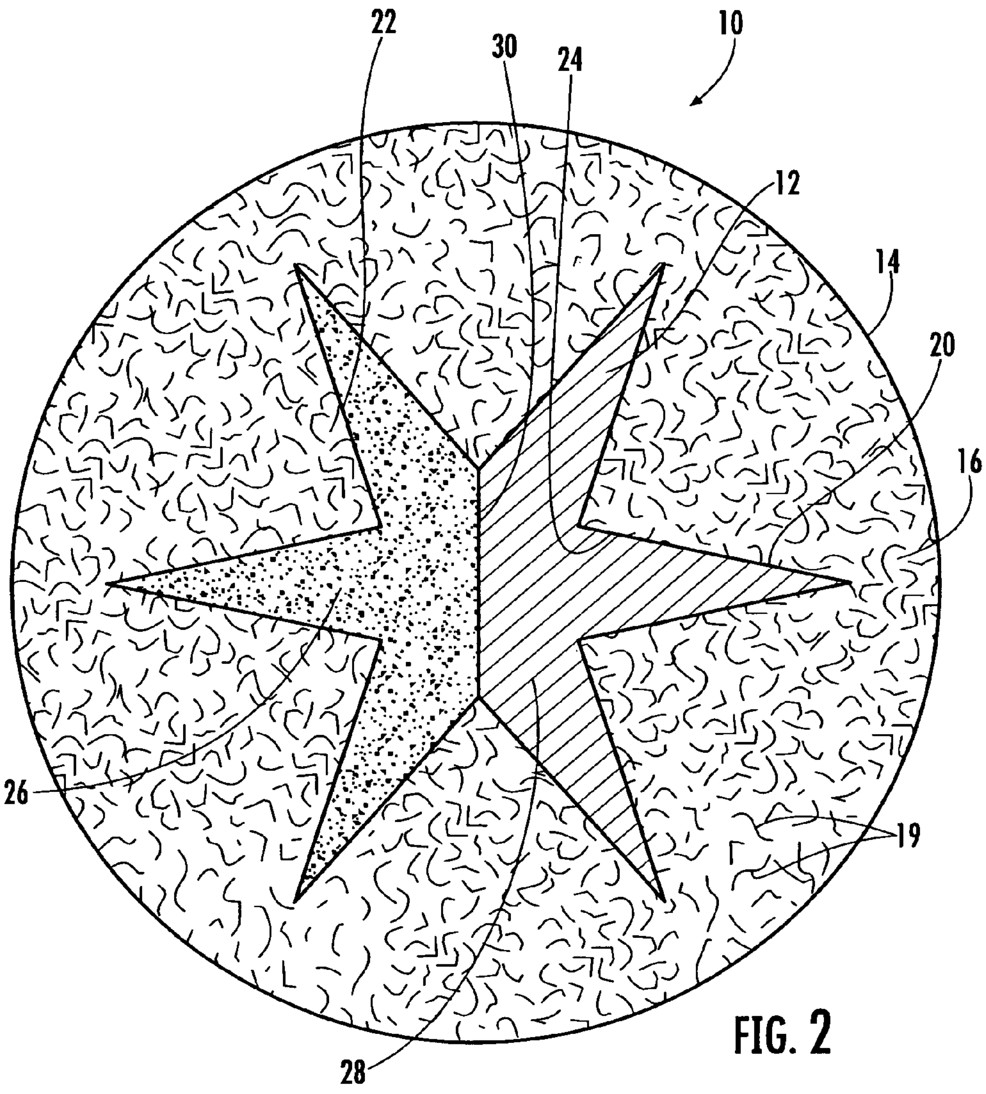
FIG. 2 is a cross-sectional view of a self-heating container assembly of the present invention through line 2—2 of FIG. 1.

Referring to FIG. 2, a cross-sectional view through line 2—2 of FIG. 1, the container assembly 10 includes a first (inner) container 12 having a cross-sectional shape of a star. A thermally conductive polymer composition is used to make the star-shaped container 12. The polymer composition contains a base polymer matrix and thermally conductive filler material. Thermoplastic polymers such as polyethylene, acrylics, vinyls, and fluorocarbons can be used as the matrix. Alternatively, thermosetting polymers such as elastomers, epoxies, polyesters, polyimides, and acrylonitriles can be used as the matrix. Suitable elastomers include, for example, polysiloxanes (silicones) and polyurethanes. Liquid crystal polymers are preferred due to their highly crystalline nature and ability to provide a good matrix for the filler material. Preferably, the polymer matrix constitutes about 30 to 60% by volume of the polymer composition.

Thermally conductive filler materials are added to the polymer matrix. Suitable filler materials include, for example, aluminum, alumina, copper, magnesium, brass, carbon, silicon nitride, aluminum nitride, boron nitride, zinc oxide, and the like. Mixtures of such fillers are also suitable. The filler material preferably constitutes about 20 to about 70% by volume of the composition. More preferably, the filler material constitutes less than 60% of each composition.

The filler material may be in the form of granular powder, whiskers, fibers, or any other suitable form. The granules can have a variety of structures. For example, the grains can have flake, plate, rice, strand, hexagonal, or spherical-like shapes. The filler material may have a relatively high aspect (length to thickness) ratio of about 10:1 or greater. For example, PITCH-based carbon fiber having an aspect ratio of about 50:1 can be used. Alternatively, the filler material may have a relatively low aspect ratio of about 5:1 or less. For example, boron nitride grains having an aspect ratio of about 4:1 can be used. Preferably, both low aspect and high aspect ratio filler materials are added to the polymer matrices as described in McCullough, U.S. Pat. Nos. 6,251,978 B1 and 6,048,919, the disclosures of which are hereby incorporated by reference.

The filler material is intimately mixed with the non-conductive polymer matrix to prepare the thermally conductive composition using techniques known in the art. Conventional injection-molding, blow-molding, melt-extrusion, or other suitable method can be used to form the composition into the shape of the inner container 12.

As shown in FIG. 1, a second (outer) container 14 completely surrounds the inner container 12 so as to create a chamber 16 therebetween. The outer container 14 can have any suitable shape but is preferably in the shape of a cylinder. A heat-insulating material such as polystyrene or plastic, such as polypropylene or polyethylene, is used to make the peripheral wall of the outer container. The peripheral outer wall 20 of the star-shaped inner container 12 serves to separate the inner container 12 from the outer container 14. The food or beverage 19 that will be heated is placed in the chamber 16 located between the two containers 12 and 14. The food or beverage 19 can be added directly to the chamber 16, or a food/beverage-containing package such as a tin foil packet can be placed in the chamber 16.

The first container 12 contains media that will produce an exothermic reaction when mixed together. Typically, the reactant media are water 28 and lime 26, but other non-toxic materials can be used. The lime 26 and water 28 are stored in separate compartments 22 and 24 prior to use. For example, the lime 26 and water 28 can be stored in separate breakable capsules, or the lime 26 and water 28 can be stored in separate compartments with a thin membrane 30 therebetween. Other structures for keeping the water 26 and lime 28 separate for later mixing can be used. When a person wishes to heat the food or beverage, the lime 28 and water 26 are mixed together to produce an exothermic reaction. For example, the entire can 10 may be shaken to break the membrane 30 and mix the lime 28 and water 26. The heat given off during the reaction is transferred along the peripheral edges of the thermally conductive first container 12 to warm the food/beverage 19 located in the chamber 16. The star-shape design of the inner container 12 is important, because it provides a large surface area for radiating heat to the food/beverage 19 in chamber 16. As used herein, the term, "star", refers to the well known figure having five or more points. It should be understood that a "star' configuration is preferred for the inner container 12. However, other configurations, such as squares, triangles, and other geometric shapes, may be employed.

The self-heating containers of the present invention have several advantageous features over conventional containers. As discussed above, the unique cross-sectional star shape gives the first container 12 a large surface area for better heat conduction. Further, the first container 12 is made from a thermally conductive polymer composition that provides an optimum pathway for transferring heat from its interior to the food/beverage material 19 located in the chamber 16. The thermally conductive composition preferably includes a crystalline polymer matrix and is anisotropic. Thus, thermal conductivity is higher along the planar surface of the inner container 12 than through the surface of the container 12.

Figure 3:
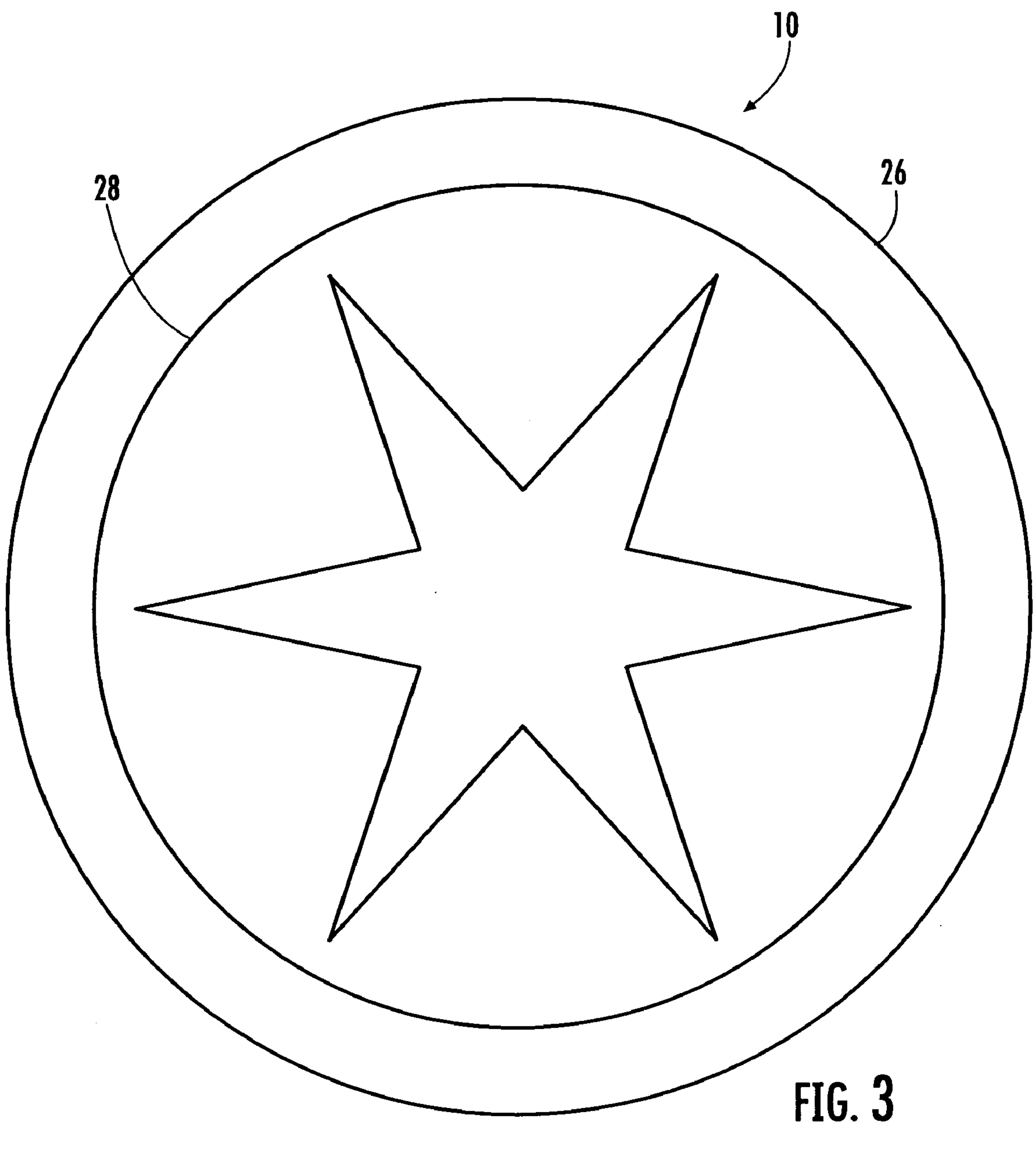
FIG. 3 is a cross-sectional view of an alternative embodiment of the self-heating container assembly of the present invention showing the outer container having a peripheral double-wall construction.

In an alternative embodiment, the outer container 14 has a peripheral wall with a double wall construction as shown in FIG. 3. The gap between the outer wall segment 26 and inner wall segment 28 is preferably filled with air but could be filled with other insulating media and materials. Both wall segments are made of a heat-insulating material such as polystyrene or plastic. For example, polypropylene or polyethylene can be used. This double wall construction prevents the loss of heat to the outside environment. As a result, more heat is retained within the chamber 16, and the time needed to sufficiently warm the food/beverage material 19 is decreased. The heated food/beverage material 19 retains the heat for a longer period of time. Further, the double wall construction keeps the self-heating container 10 cool-to-touch allowing a person to safely handle the container.

It is appreciated by those skilled in the art that various changes and modifications can be made to the illustrated embodiments without departing from the spirit of the invention. All such modifications and changes are intended to be covered by the appended claims.

What is claimed is:

1. A self-heating consumable item container, comprising:

a star-shaped inner container for holding media that will react exothermically, said star-shaped inner container having an outer wall that is formed from a thermally conductive polymer composition, said composition including a polymer matrix loaded with a thermally conductive filler material; and an outer container having a peripheral wall, said outer container being a heat-insulating assembly, wherein the outer container substantially surrounds the star-shaped inner container, wherein said peripheral wall of said outer container and said outer wall of said inner container cooperate to form a chamber therebetween for holding a consumable item.

2. The container of claim 1, wherein the thermally conductive composition includes a thermoplastic or thermosetting polymer matrix.

3. The container of claim 2, wherein the polymer matrix includes a thermoplastic polymer selected from the group consisting of polyethylene, acrylics, vinyls, and fluorocarbons.

4. The container of claim 2, wherein the thermoplastic polymer is a liquid crystal polymer.

5. The container of claim 2, wherein the polymer matrix includes a thermosetting polymer selected from the group consisting of elastomers, epoxies, polyesters, polyimides, and acrylonitriles.

6. The container of claim 5, wherein the polymer matrix includes an elastomer selected from the group consisting of polysiloxanes and polyurethanes.

7. The container of claim 1, wherein the filler material is selected from the group consisting of aluminum, alumina, copper, magnesium, brass, carbon, silicon nitride, aluminum nitride, boron nitride, and zinc oxide.

8. The container of claim 1, wherein the inner container has a thermal conductivity of greater than 3 W/m°K.

9. The container of claim 1, wherein the inner container has a thermal conductivity of greater than 22 W/m°K.

10. The container of claim 1, wherein the inner container holds lime and water.

11. The container of claim 1, wherein the heat-insulating assembly is a layer of polystyrene.

12. The container of claim 1, wherein said heat-insulating assembly is a second peripheral wall adjacent said outer peripheral wall defining an air gap therebetween.

* * * * *